United States Patent

Cortorillo et al.

[15] 3,636,401
[45] Jan. 18, 1972

[54] LIQUID-COOLED ELECTRODE FOR HIGH-PRESSURE COMPACT ARC

[72] Inventors: Salvatore Cortorillo, West New York; George A. Shaffer, Union; Herbert S. Strauss, Paramus, all of N.J.

[73] Assignee: Duro-Test Corporation, North Bergen, N.J.

[22] Filed: Dec. 22, 1969

[21] Appl. No.: 887,274

[52] U.S. Cl. ............................................................313/352
[51] Int. Cl. .................................................................H01j 1/02
[58] Field of Search .........................................313/352–354

[56] References Cited

UNITED STATES PATENTS 2,459,579   1/1949   Noel ................................. 313/352 X
3,043,972   7/1962   Laszlo .............................. 313/352 X Primary Examiner—David Schonberg
Assistant Examiner—Toby H. Kusmer
Attorney—Darby & Darby

[57] ABSTRACT

Anode and cathode electrodes for arc discharge lamps comprising an electrode holder, a tip and a joining piece of high-heat conductivity material which are cast to form a complete electrode without the need for brazing. The casting apparatus includes a mold for holding the electrode holder, tip and joining piece which permits movement of the electrode holder relative to the tip as the joining piece is heated.

11 Claims, 14 Drawing Figures

FIG. I

INVENTORS
SALVATORE CORTORILLO
GEORGE A. SHAFFER
HERBERT S. STRAUSS
BY
Darby & Darby
ATTORNEYS FIG. 2
FIG. 2A
FIG. 3
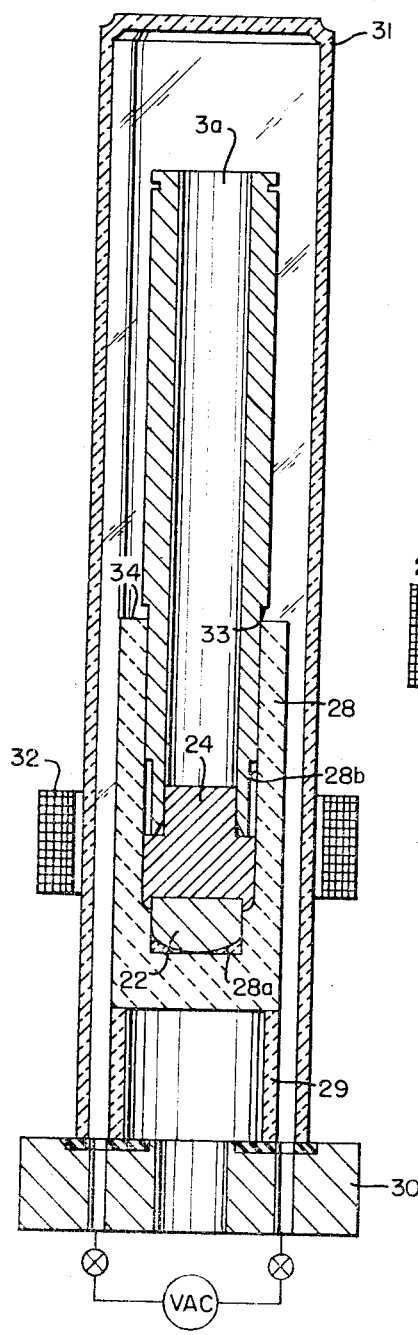
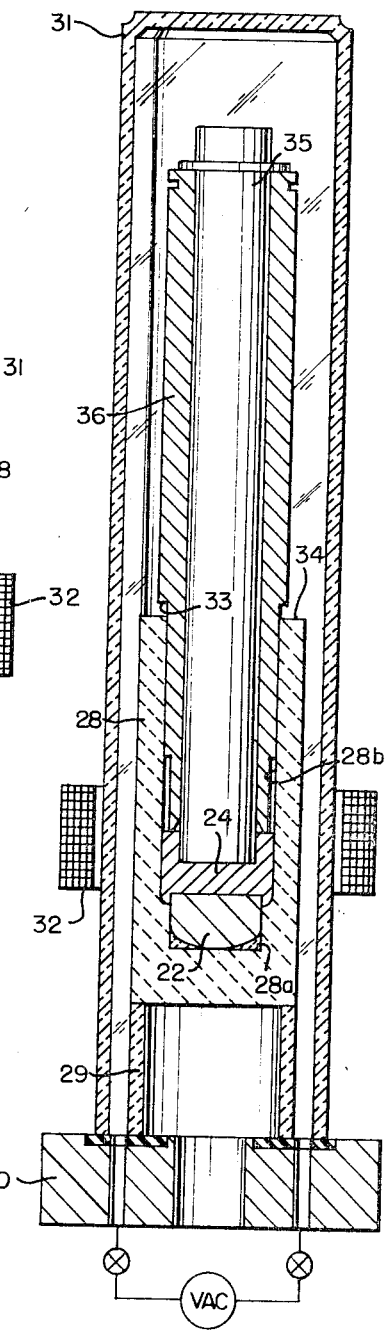
INVENTORS
SALVATORE CORTORILLO, GEORGE A. SCHAFFER
& HERBERT S. STRAUSS
BY Darby & Darby
ATTORNEYS

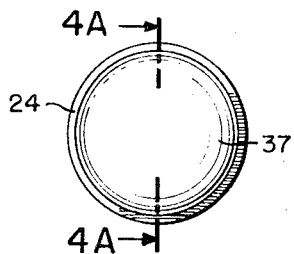
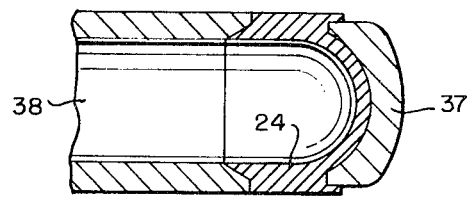
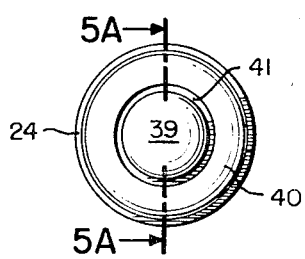
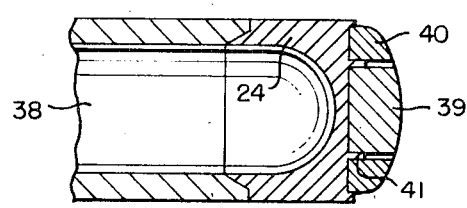
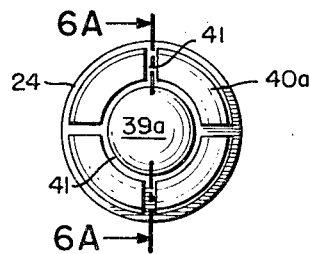
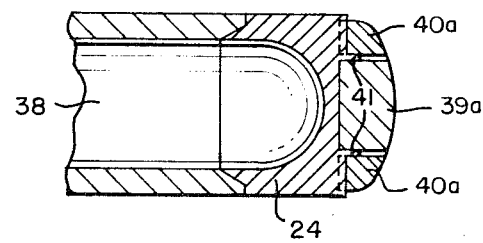
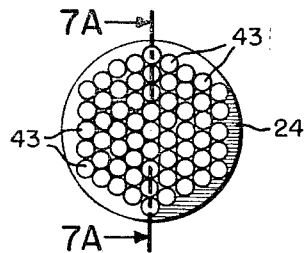
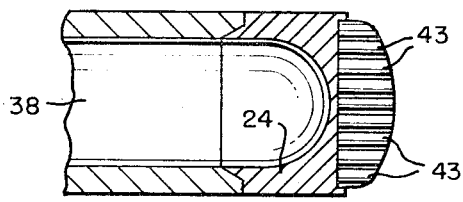
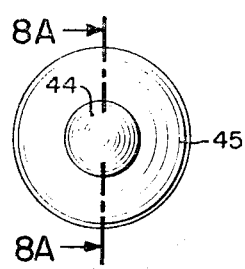
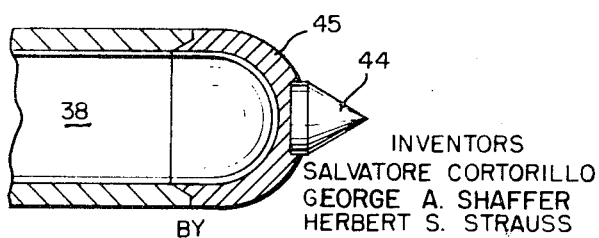
INVENTORS
SALVATORE CORTORILLO
GEORGE A. SHAFFER
HERBERT S. STRAUSS
BY Darby & Darby
ATTORNEYS

LIQUID-COOLED ELECTRODE FOR HIGH-PRESSURE COMPACT ARC

The use of high-pressure, compact arc discharge lamps is increasing in projectors, searchlights, and solar simulators. These lamps are suitable for such applications because they are stable concentrated radiation sources with very high brightness and good luminous efficacy. Compact arc lamps with xenon, xenon-mercury, and mercury fill have been most popular, the choice depending on the brightness, luminous efficacy and spectral quality requirements of the application. For solar simulator work, for example, xenon compact arc lamps are used. These lamps combine high peak brightness with a plasma spectral distribution very similar to that of the sun's U.V., visible and IR radiation. For high luminous efficacy requirements mercury compact arc lamps can be used, sacrificing the good color rendition. Lamps with additional fill components for improving the color rendition by employing the halogen cycle are described in U.S. Pat. No. 3,412,275 by W. E. Thouret.

Searchlight and solar simulator applications have stimulated development of high-wattage xenon compact arc lamps. Both these applications require the highest possible reliable wattage lamps that can be produced within the state of the art since this requires that fewer individual modules or arrays of such lamps be installed. This in turn leads to better optical control and a more uniform radiation pattern across the target or test surface.

The operation of high-wattage compact arc lamps is achieved through the use of liquid-cooled electrodes. This allows the removal of high thermal loads created at the lamp anode and cathode by the circulating coolant. Heat thus removed is not radiated. Consequently, lamp envelope dimensions can be reduced and lamp seals can be radically simplified. Typically, 25 to 35 percent of the lamp input power is removed at the electrode by the liquid coolant. Coolants successfully used have been deionized water or a suitable commercial ethylene glycol preparation if operation below 32° F. is required.

The life of high-wattage compact arc lamps with liquid cooled electrodes hinges to a critical extent on the reliable operation of the electrodes. Reliability of electrode performance in turn depends on continued good heat transfer between the electrode tips and the liquid coolant. A failure of the electrode heat transfer mechanism, for any reason whatever, will result in lamp failure either due to gradual electrode overheating, anode tip melting, or sudden catastrophic burn through.

Heretofore, the majority of the compact arc discharge lamps have used anode and cathode electrodes which are formed by an electrode holder, usually a hollow tube for transporting the coolant, and a tip of tungsten or other suitable material. The tip is normally brazed to the holder. While such electrodes operate in a generally satisfactory manner, they have several disadvantages. For example, sometimes the brazing material is formed in a discontinuous layer. This results in reduced heat transfer. Also, cracks can occur in the brazing material, which forms a hermetic seal between the coolant flowing in the inside of the electrode holder and the interior of the lamp. In addition, the types of brazing material which can be used under varying lamp operating conditions increases the care and expense needed to produce the lamp as well as restricting the designs.

The present invention relates to novel anode and cathode electrode structures for compact arc discharge lamps and methods and apparatus for making these electrodes. In accordance with the invention electrode structures are provided which are formed by a holder, usually a hollow tube to provide for fluid transport, a tip which forms the active area of the electrode, and a piece of high-conductivity metal which joins the tip and the holder. The electrodes are fabricated by a casting process in which the joining piece, which has a lower melting temperature than either the tip or the holder, is heated. When the joining piece melts, it fuses to both the holder and the tip, joining them together as an integral unit.

The casting process is carried out in a mold which is shaped to maintain a predetermined shape of the joining piece material upon its being melted. This permits the electrodes to be made in a variety of desired shapes, including split tips which can accommodate expansion of the electrode, and reduces the machining necessary to complete the electrode. The casting of the electrode is carried out under reduced pressure and the structure is preferably heated by an induction heating coil.

It is therefore an object of the invention to provide novel electrode structures for arc discharge lamps.

Another object is to provide novel methods for forming electrode structures for arc discharge lamps by casting.

Still a further object is to provide electrodes for arc discharge lamps with improved heat transfer characteristics between the electrode tip and the tip holder.

An additional object is to provide electrodes for arc discharge lamps which are formed by a casting process with a holder and a tip joined by an intermediate piece of a high-conductivity metal.

Another object is to provide novel apparatus for the casting of electrodes for arc discharge lamps.

Other objects and advantages of the present invention will become more apparent upon reference to the following specification and annexed drawings in which:

FIG. 2 is an elevational view, partly in cross section, of one form of apparatus for producing an electrode in accordance with the method of the subject invention;

FIG. 2A is a fragmentary view of the apparatus of FIG. 2;

FIG. 3 is an elevational view, partly in cross section, of another form of apparatus for producing electrodes in accordance with the invention;

Figure 1:
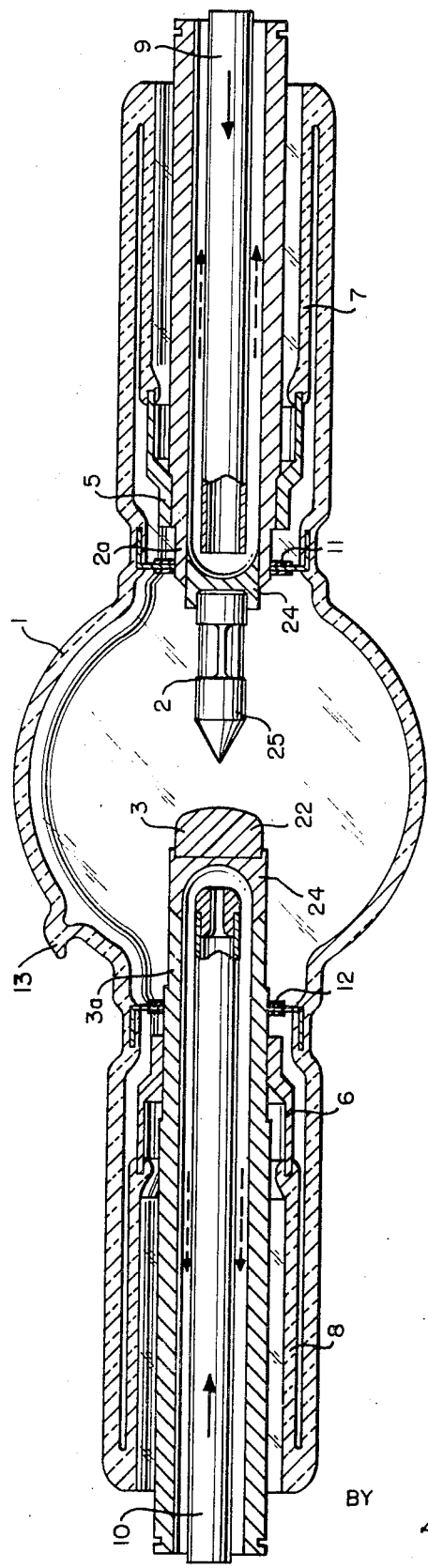
FIG. 1 is a plan view, partially in cross section, of a compact arc discharge lamp having electrodes made in accordance with the subject invention.

FIG. 4–4A, 5–5A, 6–6A, 7–7A, and 8–8A, are respectively front and side views, the latter being fragmentary and partly in cross section, of electrodes made in accordance with the subject invention.

FIG. 1 shows a typical type of compact arc xenon lamp with liquid cooled electrodes for DC operation. With the exception of the electrodes, the lamp structure is otherwise conventional. An envelope 1 of clear fused quartz or equivalent high silica transparent material contains opposing cathode and anode electrodes 2 and 3 which are fabricated in accordance with this invention and mounted at the ends of hollow conductive holders, or tubes, 2a and 3a. The cathode 2, which is the electron emitter, has a typical cone-shaped surface at its tungsten tip 25. This shape assures high current densities for plasma concentration near the tip and is responsible for the high bright characteristics of lamps of this type. The anode 3 has a flatter, button-shaped tip 22.

The electrode assemblies 2 and 3 are mounted at the arm extension of the envelope 1. To permit the lamp to be hermetically sealed, cups 5 and 6 which are preferably of a heat-resistant material such as Kovar metal, are brazed to the tubular members 2a and 3a and a series of "graded seal" glasses 7 and 8 are sealed between the ends of the cups 5 and 6 and the ends of the envelope. Brazing materials can be varied according to individual processes but are usually metals of the silver or silver-copper-palladium classes. In a typical graded seal construction, the glasses reduce in thermal expansion coefficient from, for example, 7052 Kovar sealing glass to 3320 to 7740 glass. To the latter is attached a 7740 Pyrex to Vycor graded seal or a quartz graded seal. The final hermetic lamp seal is effected by melting the Vycor or quartz end of the envelope 1.

Relatively small electrode, graded seal and envelope dimensions are obtained through the use of liquid cooling of the electrodes. In practice, lamps of the type being described have operated successfully in the 30–50 kw. range. Coolant inlet tubes 9 and 10 are located within the tubular portions 22 and 3a of electrodes 2 and 3. Coolant fluid is introduced into the tubes, as shown by the solid arrows, typically at a pressure of 100 to 300 p.s.i.g. at flow rates of 2 to 10 g.p.m., and impinges on the inside surface of the tips of the electrodes 2 and 3. This removes approximately 30 to 35 percent of the heat produced by the input power. The return flow of the coolant (shown by the dashed arrows) is in the space between the coolant tubes 9 and the respective electrode holders 2a and 3a. The electrical connectors and the plumbing for the inlet and outlet of the coolant is not shown.

The electrode assemblies 2 and 3 are laterally supported within the envelope by electrode supports 11 and 12 which also assure axial alignment of the electrode tips. The lamp is exhausted and filled in the way understood by those familiar with high-pressure xenon lamp processing technology. Typically, the high-pressure xenon is introduced into the lamp interior by immersing a portion of the envelope into liquid nitrogen. Xenon is then introduced into the lamp and the envelope's exhaust tube 13 is short tipped and sealed. The frozen gas is then allowed to ward up and expand to the design fill pressure. Each lamp electrode tube is terminated in a coolant and electrical terminal head (not shown) for installation into optical systems. For a more detailed explanation of this mounting, reference is made to the copending application of H. S. Strauss, Ser. No. filed concurrently herewith, entitled "High-pressure Compact Arc Lamp With Pressure Reducing Means" and assigned to the same assignee.

The anode 3 includes a tip 22 of a suitable material such as tungsten, and the cylindrical holder tube 3a is preferably of molybdenum, nickel, or stainless steel. In accordance with the invention, the tube and tip are joined together by a segment 24 of high thermal conductivity material such as copper or silver. If the tube 3a is fabricated out of high thermal conductivity material, such as copper, it can also be joined directly to the tungsten tip 22 as is described below.

The cathode 2 is constructed in a similar manner with its tip 25, tube 2a and joining segment 24 of high-conductivity material. Prior to the present invention, the generally used methods of electrode construction were as follows:

1. A tungsten tip is joined to a closed end of a holder tube by an intermediate brazing material. The tube may be molybdenum, copper, or stainless steel and it is machined to allow coolant to circulate through it and impinge on the closed end of the tube. Heat transfer is then achieved from the tungsten tip-through the brazing material-through the closed tube end and finally to the coolant.
2. A tungsten electrode tip which is joined to a hollow holder tube by a brazing material. The tube may again be molybdenum, copper or stainless steel. The coolant will impinge on the rear of the electrode tip surface. Heat transfer is achieved from the tungsten tip to the coolant directly.
3. A tungsten electrode tip which is joined to a hollow holder tube by a brazing material. A high thermal conductivity material, such as copper, is then flowed into the hollow tube to contact the rear surface of the tip and the tube wall. Heat transfer is achieved from the tungsten tip through a "parallel" path including the brazing material to tube wall to coolant and the flowed material to coolant. The latter path has the higher thermal conductivity.
4. A tube fabricated out of high thermal conductivity material, such as copper, which is closed and shaped at one end to integrally form the anode tip. Heat transfer is achieved directly through the anode tip to the coolant.

The four methods described are equally applicable to anode and cathode configurations. However, since the majority of compact arc lamps are operated on direct current for better plasma stability; the anode, with its resulting far greater power input, has received the most attention in electrode heat transfer solutions. Thus, the following description will be illustratively directed toward anode electrode structures, it being understood that it applies equally as well to cathode structures.

The four types of prior art electrode structures described above and the methods for making them have several disadvantages. Method 4, while seemingly the most straightforward and best of all methods described, is the most critical in design and assembly and the most sensitive in operation. The only practical material found to data for its fabrication is copper. To prevent instant anode burn-through, a very thin copper surface must be backed up by a very high velocity coolant flow. The high velocity is obtained by a very thin channel through which the coolant is forced at high pressure. The channel is easily clogged resulting in immediate electrode failure. To minimize clogging, continuously deionized, filtered water is used. Even if clogging can be prevented, the use of water limits the operation of the lamps to temperatures above 32° F. unless immersion heaters are used to warm up the water before ignition. Many applications cannot tolerate these system complications and in general cannot tolerate such a sensitive lamp design.

Method 1 has the obvious disadvantage of performing a "blind" brazing operation. This means that the quality of the brazed joint and layer cannot be seen. A discontinuous layer produced during brazing between the tip and the closed end tube will prevent proper heat transfer. Also, the brazing material must be of lower melting point than either the tip or the tube. If a copper tube is used for best heat transfer the brazing material must melt below 1,083° C. This limits the tungsten tip to a thickness dimension which will ensure that the operating temperature of the brazed joint stays below the critical vapor pressure point of that material. While the brazing joint or layer however need not form a hermetic seal it must "wet" both the tip and the tube. Providing such a joint in a "bling" operation is often quite difficult.

In method 2 the small ring of brazing material must form and maintain a hermetic seal. The method also has the disadvantage that the tiniest crack or fissure in the tungsten tip will allow the lamp to leak gas or allow coolant to enter the lamp. Since tungsten is a refractory material, cracks and fissures are to be expected and the heat transfer system design must take this into account.

Method 3 does not require the brazing material to form a hermetic seal as long as the high thermal conductivity flowed material will perform that function. However, the choice of brazing, electrode tube, and the flowed material must be compatible with each other in terms of their melting points throughout lamp fabrication and life. For example, in a highly reliable electrode construction for lamps up to 20 kw. power rating, the tungsten tip is joined to a hollow, cylindrical molybdenum tube with a platinum braze. Copper is then flowed to the back surface of the tungsten tip and the adjacent tube area to effect the hermetic seal and provide the high thermal conductivity path. The use of these materials makes the design of the lamp more difficult and more costly.

The present invention eliminates many of the difficulties of prior art electrodes for compact arc lamps by providing electrode structures in which the tip and tube are directly cast together. This completely eliminates the need for an intermediate brazing material and the steps of applying and machining such a material in the fabrication of the electrodes.

FIGS. 2 and 2A show one apparatus and method used to fabricate an electrode according to this invention. The fabrication of an anode electrode is described, it being understood that the fabrication of a cathode electrode is carried out in a similar manner. A mold 28, which can be of graphite, is machined to accept: the tungsten tip 22 in a pocket 28a the segment of high thermal conductivity material 24, which can be, for example, OFHC copper 24 at the bottom of a bore 28b and the electrode holder tube 3a. As seen, the tube 3a has a shouldered down portion 33 which is located above the top edge 34 of mold 28. The tube 3a is made of molybdenum, nickel, or stainless steel. Joining piece 24 is shown in the shape of a plug whose reduced diameter end fits within the holder 3a. The mold 28 rests on a ceramic sleeve 29 to thermally insulate it from a bell jar baseplate 30 during the casting operation. The baseplate 30 is attached to a vacuum system.

A quartz bell jar 31 is placed over the entire assembly, which is then evacuated, for example, to a maximum pressure of $10^{-4}$ torr. An induction generator load coil 32 is positioned around the bell jar. When power is applied to the generator, the load coil inductively heats the three electrode components 22, 24 and 3a. The copper (or silver if used) of the high thermal conductivity segment 24, having a lower melting point than the tungsten of the tip 22 or the molybdenum, nickel, or stainless steel of the tube 3a will liquify. The electrode tube 3a will then slide down inside the graphite mold until the step 33 contacts the top surface 34 of the mold 28. This is shown in FIG. 2A. The liquid copper (or silver) of the piece 24 wets both the surfaces of the tip and the tube and forms a hermetic, low thermal barrier bond between the sections. The copper will, of course, not adhere to the graphite and the whole electrode can be easily removed from the mold 28 after cooling to room temperature. Subsequent machining of the inside of the electrode tube 3a provides the desired internal and external contours, for example as shown in FIG. 1.

During the fabrication of the electrode, the induction heat must be controlled to prevent violet sputtering as the materials outgas. Outgassing, however, must be allowed to proceed slowly and completely to prevent bubble formations inside the case section.

The cathode electrode 2 is processed in the same manner but with its own schedule of induction generator heating. The graphite mold will be different in shape since it must be machined to accept the conical cathode tip 25.

FIG. 3 shows an arrangement for casting a tungsten tip to a copper electrode tube. Here a mandrel 35, which can be of graphite, is inserted inside a copper electrode tube 36 to maintain the inside diameter of the tube during the melting and fusing of the lower area of the copper tube and the copper segment 24. The remainder of the apparatus and the process for fabricating the electrode is as described with respect to FIG. 2. Subsequent machining will again provide the desired internal contour.

FIGS. 4 through 8 show additional electrode configurations formed with the method and apparatus of the subject invention. Each configuration has its purpose in solving particular lamp design problems and achieving certain lamp characteristics.

In FIGS. 4-4A a thin tungsten shell 37 forming the electrode tip is joined by the high-conductivity piece 24 to the electrode tube 38 using the process and apparatus of either of FIGS. 2 and 3. As seen, the tungsten tip shell 37 has a concave inner surface to which the metal of the piece 24 has fused and conformed in shape. The thin tungsten shell 37 yields lower tip temperatures than the thicker, more massive tip 22 shown in FIG. 1. This design is preferable for lamps in the 30 to 40 kw. category where the current is about 600 to 800 amperes compared to approx. 450 amperes for the 20 kw. types. The direct casting method and the subsequent machining allows the uniform copper backing of the concave tip surface shown for smooth coolant flow.

FIGS. 5-5A show a compound tungsten tip comprised of an inner core 39 and an outer ring 40. In this case, the pocket 28a of the graphite mold is machined with a separation wall which controls the spacing between the core 39 and the ring 40. The portion 41 of the heat conductive material, such as copper, which flows into the space between the core and the ring during the casting process is acid etched out to the desired distance form the front of the tip. This tip connection construction permits radial expansion of the tip to compensate for the radial thermal gradients induced in the tip by the non-homogeneous plasma of a DC discharge. Lamps with this tip construction have been successfully operated at 30 to 50 kw.

FIGS. 6-6A show an electrode having inner core 39a and outer ring 40a tip construction with the additional feature of dividing the outer ring into four sections. As many sections as desired can be used and the mold pocket 28a is designed to provide the spacing. This construction allows radial expansion of the inner core 39a and a combination of both radial and circumferential expansion in the outer ring sections 40a.

FIGS. 7-7A show a tip formed of a plurality of tungsten rods 43 which are cast to the electrode tube. The copper which flows in between the rods can be etched away to a desired depth. This structure integrates a tip out of many parts thus further reducing the chances of cracking or fissure development. In this case, the rods 43 can be machined to the desired shape after casting, or else, different size rods using during the casting. Again, the pocket 28a of the mold is formed to accommodate and hold the rods.

The direct casting apparatus and method as applied to a cathode configuration, different from FIG. 1, is shown in FIGS. 8–8A. Here, a short conical cathode tip 44 is cast directly into the high thermal conductivity OFHC copper or silver segment 45. In this case, the mold pocket 28a shaped to accommodate the conical tip 44 and the shoulder above the pocket is rounded to produce the desired final shape for the piece 45. This reduces the tip temperature even further then the structure shown in FIG. 1. The additional decrease in temperature will further increase the current density at the tip, thus increasing the core temperature of the discharge and consequently the plasma brightness.

As should be apparent, the shape of the mold 28 above the pocket 28a shown in FIGS. 2 and 3, retains a desired shape of the joining piece as it is being heated and melts. This arrangement reduces the amount of machining needed for the electrode.

In each of the embodiments of electrodes shown, the rear surface of the tip is in intimate contact with the joining piece 24 and completely covers the rear surface. Thus, there is a good heat transfer path from the coolant to the joining piece to the tip. This path is continuous, unbroken, and can be machined internally to a desired shape preferably with a smooth surface finish. This arrangement also reduces the leakage problem due to improper hermetic seals.

The description of lamp and electrode structures presented here, is illustratively for compact arc xenon lamps for DC operation. It should be understood, however, that the electrode structures are equally applicable for mercury or mercury-xenon compact arc lamps for DC and/or AC operation. Those familiar with the art of fabricating these lamps will realize that: for AC operation identical electrodes have to used for anode and cathode; and, for mercury or mercury-xenon lamps certain minimum envelope temperatures must be maintained such as 450° –600° C., to achieve the desired mercury vapor pressure. These temperatures are well within the materials and design limits of the electrode structures described in this disclosure.

What is claimed is:

1. An electrode structure for an arc discharge lamp comprising a tubular holder of metal material, a rigid joining piece of a conductive material having a rigid, closed arc tip mounting surface on one end thereof, the other end of said joining piece formed with an opening to provide access into the interior of the joining piece, and an arc tip having a mounting surface, said mounting surface of said arc tip being fused to said mounting surface of said one end of said joining piece and said tubular holder being fused to said joining piece at a location to close off one end of sad tubular holder by said joining piece and to provide communication between the passage of the holder and the opening in said joining piece into the interior of the joining piece.

2. The electrode structure of claim 1 wherein said tip has a rear surface with a depression, the mounting surface of said joining piece having a shape conforming to said depression.

3. The electrode structure of claim 2 wherein the depression of said tip is generally concave and the mounting surface of the joining piece is generally convex.

4. The electrode structure of claim 1 wherein said tip comprises a central core piece and a concentric ring, the rear faces of said central core and said ring being fused to the mounting surface of said joining piece.

5. The electrode structure of claim 1 wherein said tip comprises a central core piece and a concentric ring, said ring being split into a number of sections, the rear faces of said central core piece and said ring sections being fused to the mounting surface of said joining piece.

6. The electrode structure of claim 1 wherein said tip comprises a plurality of rods whose rear ends are fused to said mounting surface of sad joining piece.

7. The electrode structure of claim 1 wherein said joining piece mounting surface has an arcuate outer surface, the rear face of said tip being fused to only a portion of said outer surface.

8. The electrode structure of claim 1 wherein said mounting surface of said joining piece and said tip have mating means for locating the tip on the mounting surface.

9. The electrode structure of claim 1 wherein said holder and said joining piece are of the same material.

10. The electrode structure of claim 1 wherein said joining piece is of a material having a lower melting point than the materials of said holder and said arc tip.

11. The electrode structure of claim 10 wherein said tip and said holder are fused directly to the joining piece with the joining piece serving as the fusing material.

* * * * *

UNITED STATES PATENT OFFICE
CERTIFICATE OF CORRECTION

Patent No. 3,636,401      Dated December 22, 1969

Inventor(s) SALVATORE CORTORILLO and GEORGE A. SHAFFER

It is certified that error appears in the above-identified patent and that said Letters Patent are hereby corrected as shown below:

Col. 2, line 36, change "FIG." to -- FIGS. --

Col. 2, line 52, change "bright" to -- brightness --.

Col. 2, line 67, after "the" (second occurrence) insert -- graded seale 7 and 8 to the end of each extension arm of the --

Col. 2, line 72, change "22" to -- 2a --

Col. 4, line 30, change "bling" to -- blind --

Col. 5, line 64, delete "connection"

Signed and sealed this 8th day of October 1974.

(SEAL)
Attest:

McCOY M. GIBSON JR.
Attesting Officer

C. MARSHALL DANN
Commissioner of Patents